US010678198B2

(12) United States Patent
Burstall et al.

(10) Patent No.: US 10,678,198 B2
(45) Date of Patent: Jun. 9, 2020

(54) POWER DISTRIBUTION CONTROL SYSTEM

(71) Applicant: Origami Limited, Godalming, Surrey (GB)

(72) Inventors: Oliver William John Burstall, Huntingdon (GB); Peter Martin Bance, Reigate (GB)

(73) Assignee: ORIGAMI ENERGY LIMITED, Cambridge (GB)

( * ) Notice: Subject to any disclaimer, the term of this patent is extended or adjusted under 35 U.S.C. 154(b) by 794 days.

(21) Appl. No.: 14/826,950

(22) Filed: Aug. 14, 2015

(65) Prior Publication Data

US 2016/0056628 A1 Feb. 25, 2016

(30) Foreign Application Priority Data

Aug. 19, 2014 (GB) .................................. 1414724.3

(51) Int. Cl.
*G05B 15/02* (2006.01)
*H02J 13/00* (2006.01)
(Continued)

(52) U.S. Cl.
CPC ................ *G05B 15/02* (2013.01); *H02J 3/32* (2013.01); *H02J 13/0079* (2013.01);
(Continued)

(58) Field of Classification Search
CPC ........ G05B 15/02; H02J 13/0079; H02J 3/32; H02J 2003/003; Y02E 60/722; Y04S 10/54; Y04S 10/14
(Continued)

(56) References Cited

U.S. PATENT DOCUMENTS

2007/0097993 A1* 5/2007 Bojahra .................. H04L 41/00
370/401
2008/0040223 A1* 2/2008 Bridges ............... B60L 11/1816
705/14.69
(Continued)

FOREIGN PATENT DOCUMENTS

GB 2 472 280 A 2/2011
GB 2506401 A 4/2014
(Continued)

OTHER PUBLICATIONS

Aris Dimeas et al.; "Microgrids Control Issues", Microgrids, Dec. 26, 2013 (Dec. 26, 2013), John Wiley and Sons Ltd., Chicester, United Kingdom, pp. 25-80.
(Continued)

*Primary Examiner* — Robert A Cassity
(74) *Attorney, Agent, or Firm* — Katten Muchin Rosenman LLP

(57) ABSTRACT

A power distribution control system having a string of power assets comprising at least two different power assets selected from sources, stores and responsive loads is disclosed. The assets and associated local routers communicate with a central server and attempt to fulfil high level aims of the server by negotiating times and quantities of power transfer between themselves. Preferably a database stores parameters in relation to the power assets. Preferably a control system at the server anticipates future activity, such as future peaks in demand or supply, in the grid, and local power assets prepare in response. Preferably the power assets communicate between themselves on a peer-to-peer basis and collectively confirm to the server their ability to modify their collective behavior in response to an event in the grid.

38 Claims, 8 Drawing Sheets

(51) Int. Cl.
*H02J 3/32* (2006.01)
*H02J 3/00* (2006.01)

(52) U.S. Cl.
CPC ............ *H02J 3/003* (2020.01); *Y02E 60/722* (2013.01); *Y04S 10/14* (2013.01)

(58) Field of Classification Search
USPC ........................................................ 700/295
See application file for complete search history.

(56) References Cited

U.S. PATENT DOCUMENTS

| | | | |
|---|---|---|---|
| 2008/0167756 A1* | 7/2008 | Golden ................ | G05B 15/02 700/297 |
| 2009/0088907 A1 | 4/2009 | Lewis et al. | |
| 2009/0093916 A1* | 4/2009 | Parsonnet ............ | F24F 5/0017 700/286 |
| 2010/0211233 A1* | 8/2010 | Roscoe ................ | H02J 3/008 700/296 |
| 2010/0217550 A1* | 8/2010 | Crabtree .............. | H02J 3/005 702/62 |
| 2010/0218108 A1* | 8/2010 | Crabtree .............. | G06Q 50/06 715/738 |
| 2011/0208367 A1 | 8/2011 | Sackman et al. | |
| 2012/0074909 A1* | 3/2012 | Hondo .................. | H02J 3/32 320/128 |
| 2012/0086273 A1* | 4/2012 | Rognli .................. | H02J 3/14 307/43 |
| 2012/0166008 A1 | 6/2012 | Jeong | |
| 2012/0203387 A1* | 8/2012 | Takayama ........... | H01M 10/441 700/291 |
| 2013/0090777 A1 | 4/2013 | Lu et al. | |
| 2013/0241532 A1* | 9/2013 | Voisine ................ | G01R 11/17 324/110 |
| 2013/0270911 A1* | 10/2013 | Baba .................... | H02J 7/34 307/65 |
| 2013/0274939 A1 | 10/2013 | Eger et al. | |
| 2014/0074311 A1* | 3/2014 | Kearns ................. | H02J 3/38 700/297 |
| 2014/0094979 A1* | 4/2014 | Mansfield ............ | H02J 3/383 700/291 |
| 2014/0117781 A1 | 5/2014 | Kesten-Kuhne et al. | |
| 2014/0277795 A1* | 9/2014 | Matsuoka ............ | G06Q 30/0202 700/291 |
| 2015/0127179 A1* | 5/2015 | Binding ............... | H02J 3/28 700/291 |
| 2015/0280436 A1* | 10/2015 | Weckx ................. | G06Q 50/06 700/295 |
| 2016/0049790 A1* | 2/2016 | Wordsworth ........ | H02J 3/32 700/297 |
| 2016/0280092 A1* | 9/2016 | Jefferies .............. | B60L 11/184 |
| 2017/0176965 A1* | 6/2017 | Martin Lloret ...... | G06Q 10/06 |

FOREIGN PATENT DOCUMENTS

| | | |
|---|---|---|
| JP | 2002-152976 A | 5/2002 |
| JP | 2010-204833 A | 9/2010 |
| JP | 2011-59939 A | 3/2011 |
| JP | 2014-501096 A | 1/2014 |
| WO | 2012008979 A2 | 1/2012 |
| WO | 2012/066651 A1 | 5/2012 |
| WO | 2012/145563 A1 | 10/2012 |
| WO | 2013042100 A1 | 3/2013 |
| WO | 2013/084268 A1 | 6/2013 |
| WO | 2014/033892 A1 | 3/2014 |
| WO | 2014/061259 A1 | 4/2014 |

OTHER PUBLICATIONS

International Preliminary Examination Report dated Dec. 2, 2016 for PCT Application No. PCT/GB2014/052542.
International Search Report Issued in International PCT Application PCT/GB2014/052542 dated Mar. 5, 2015.
Considine, Toby, et al., "Understanding Microgrids as the Essential Architecture of Smart Energy", Grid-Interop Forum, (2012).
Search Report Issued in GB1414724.3 dated Feb. 11, 2015.
Search Report Issued in GB1414724.3 dated Mar. 20, 2015.
Cox, William, et al., "Energy, Micromarkets, and Microgrids", Grid-Interop Forum, (2011).
Anonymous: "Demand response—Wikipedia" Jul. 27, 2014, retrieved from the Internet on Jan. 3, 2018 at URL <https://en.wikipedia.org/w/index.php?title=Demand response&oldid=618737226#citenote-bookSG~7>.
Partial European Search Report for European Patent Application No. 17204782.1 dated Jan. 18, 2018.
Extended European Search Report for European Patent Application No. 17204784.7 dated Jan. 19, 2018.
R. Jain et al. "Smart Energy Meter: A Device to Measure the Frequency Deviation and Power Quality Measurement", International Journal of Scientific & Engineering Research, Jul. 13, 2013, Retrieved from the Internet on Jan. 10, 2018 at URL <https://www.ijser.org/researchpaper/Smart-Energy-Meter-A-Device-To-Measure-The-Frequency-Deviation-And-Power-Quality-Measurement.pdf>.
Office Action for Japanese Patent Application No. 2017-509781 dated Apr. 17, 2018.

* cited by examiner

POWER DISTRIBUTION CONTROL SYSTEM

RELATED APPLICATIONS

The present application claims the priority of GB Application No. 1414724.3, entitled "Power Distribution Control System," and filed Aug. 19, 2014, which is hereby incorporated by reference in its entirety.

FIELD

The present invention relates generally to the field of electrical power control systems, and more particularly, to systems, methods, and apparatus embodiments for actively managing power supply from any electric power generation source or storage device for introduction to an electric power grid.

BACKGROUND

It is well known that electric power delivered during periods of peak demand can cost substantially more than off-peak power.

Various schemes are known, often referred to as "smart" appliance or "smart meters" to enable a given consumer to benefit from different prices for power. US patent application 2007/0276547, for example, seeks to optimize control of energy supply and demand by scheduling the control of energy consumption devices on the basis of variables relating to forecast energy supply and demand and by providing local battery storage and alternative energy sources (e.g., photovoltaic cells) which sell energy to the power grid during periods that are determined to correspond to favourable cost conditions. The instantaneous energy usage of a premises or a business are monitored and batteries are used to reduce demand from the grid. Solar power production is predicted in 15-minute intervals based on the previous 15 minutes. Non-critical energy uses ("deferrable loads") such as a commercial freezer can be temporarily shut off (it is described that freezers can be shut off for two hours at a time whereas refrigerators can be shut off for only 15 minutes at a time and should operate for three hours out of every four). The 15-minute estimates can be replaced by a forecast pattern of use that is selected based on predicted weather, scaled depending on actual use (demand).

Whereas such schemes contribute to reducing demand from the grid at peak time, nevertheless, from the point of view of the grid operator, peaks will be experienced and it is nevertheless expensive to have to provide for sufficient capacity to meet these peaks.

One solution to this problem is a pumped-water energy storage facility such as that installed in Dinorwig in Wales. At this facility, excess energy provided by power generators in periods of low electricity demand is used to pump water from a lower reservoir to a higher reservoir. In periods of high electricity demand, the pumped water is allowed to flow from the upper reservoir via a conventional hydroelectric generating turbine to the lower reservoir to generate additional power to assist to match sudden additional electricity demand to the electricity power network. Whereas the response of such a facility can be quite fast, it is not necessarily fast enough to maintain voltage and frequency specifications at a point quite remote from the facility. It is also an expensive solution in terms of infrastructure and environmental impact and it is relatively energy inefficient.

Clean forms of energy generation, such as wind and solar, suffer from intermittency, which can be quite rapid, with changing wind gusts or cloud occlusion. These and other factors can contribute to grid instability, which wastes energy, both directly and indirectly, for example by requiring power generators and or encouraging power consumers to install expensive or inefficient forms of backup generation.

US patent application US2009/0200988 and U.S. Pat. No. 5,642,270 proposes an improvement by aggregating electric vehicle batteries to meet medium- and large-scale needs of power services, and an arrangement is described in which a vehicle battery and associated power electronics within the vehicle can provide local power backup power during times of peak load or power outages.

Other efforts, such as GB2472280A, focus on "responsive loads" such as domestic refrigerators, air conditioning, washing machines and the like that can report to a national grid centre control room their actual availability at any given time to respond to a bidding market in which, individually, they temporarily elect periods of time in which to consume power.

When power supplied and power consumed are not equal, the supply system either accelerates (e.g., when there is a rapid fall-off in load), causing the generators to spin faster and hence to increase the line frequency, or decelerates (e.g., when there is a rapid increase in demand), causing the line frequency to decrease.

Variations in line frequency can occur due to rapid changes in supply (e.g., photovoltaic sources) as well as in demand. For this reason or for other reasons (e.g., localized pinch points in the distribution grid), it may not be possible to utilize local electricity production capacity. Hardware constraints sometimes have to be placed on local ability to feed into the grid (see US2007/0276547).

To respond to fluctuations in line frequency "regulating reserve" must be available almost immediately when needed (e.g., in as little as a few seconds to less than about five (5) minutes). Governors can be incorporated into a utility's generation system to respond to minute-by-minute changes in load by increasing or decreasing the output of individual macro generators and, thereby, engaging or disengaging, as applicable, the utility's regulating reserve. This is described in US2014/0018969, which also describes how providing electric power to the grid from storage devices such as fuel cells battery devices and energy potential systems (including stored water systems) raises new challenges. That document proposes a reporting infrastructure for control by a grid operator and proposes "active supply clients" for management of electric power available to the electric power grid, whether by generation source supply elements or by storage source supply elements (such as battery, fuel cell, compressed air, stored water or the like), with the aim of generation balancing so that storage devices serve to stabilize and regulate renewable energy resources, or with the aim of optimization according to various factors such as cost, timing, price, market conditions and the like.

These new challenges are not served by centralized grid management, not least because of latency in control systems (especially latency in client-server reporting and control arrangements). A further issue is that changes can occur at short notice in the very infrastructure to be controlled. For example, a responsive load such as a refrigeration plant may withdraw its availability as a responsive load in a predictable or unpredictable manner, thus upsetting the sought-after balance in generation. Similar considerations apply to sources and to stores.

Neither does centralized management and control address the problem of pinch-points, by which a macro-level attempt to balance supply and demand can be thwarted if there is some local node which is a limiting factor at a particular time of day. Indeed, to achieve balance at a macro-level may create new peaks in current at new points in the network and at unforeseen times. This in turn can lead to additional cost through having to increase design specification, or opportunities for cost saving can be missed in day-to-day operation, e.g., where cost of emergency maintenance exceeds normal operating costs, but cannot be avoided because of inflexibility in the control arrangements.

SUMMARY

According to an aspect of the invention, a power distribution control system is provided having a string of power assets comprising at least two different power assets selected from: sources, stores and responsive loads, and a router for controlling each of the power assets and for communicating with controllers of other power assets in the string on a peer-to-peer basis. A server is provided for communicating with the routers of the power assets in the string and for indicating to each router: (i) what are the other assets of the string so that the routers of the assets can commence communication with each other; and (ii) high level aims at the level of the server which the assets together should attempt to fulfil by negotiating times and quantities of power transfer between themselves.

According to another aspect of the invention, a method of operation of a power distribution system having power assets is provided, where the system has at least two different power assets selected from: sources, stores and responsive loads. The method comprises: providing a local controller for controlling each of the power assets and a server in communication with the local controllers; identifying at the server a set of power assets that are to form a balanced string that is to try to meet objectives set by the server; sending a message from the server to each controller indicating the other assets of the balanced string; and communicating between the local controllers of the assets in the balanced string to negotiate times and quantities of power transfer between themselves that will meet the set objectives.

According to another aspect of the invention, a power distribution control system is provided having a string of power assets comprising a plurality of power assets selected from: responsive sources, stores and responsive loads, each being connected to a grid and each having a local router. There is a server in communication with the local routers, and a control system at the server for anticipating times of peak activity in the grid and for providing to the local routers parameters indicative of future times of peak activity. Each local router is adapted to receive the parameters from the control system and to cause its associated asset to actively prepare for the future peak by: in the case of a load, preparing the load to be in a state to consume more energy or require less energy at the time of the peak; in the case of a store, preparing the store by discharging into the grid or charging from the grid in advance of the peak; and in the case of a source, preparing the source to be in a state to produce more energy [or less energy] at the time of the peak, whereby the assets co-operate at the anticipated time to reduce the effect of the peak on the grid outside the string.

References to "grid" are references to a power distribution network operating preferably at low voltage (about 415V three-phase to 11 kV), but possibly at medium voltage (about 11 kV to 33 kV), or high voltage (up to 132 kV). The principals described herein are not irrelevant to transmission networks operating at extra high voltage (above 400 kV) but this range is of lesser interest.

The source(s) of power, load(s) and the energy storage and release element may form a balanced string in which, over time, the three in combination call for energy at a limited rate of change.

Preferably, the or each load is arranged to store energy from the source(s) at times when the or each source produces more energy than is required by the load(s) and to deliver energy to the load(s) at times when the or each load requires more energy that can be supplied by the source(s). A control system controls the source, load and store to balance the three to maintain an operation state in which the energy demands of the three together do not exceed a given rate of change. Means are preferably provided for dynamically adding or removing power elements to the string to maintain a status in which the energy demands of the string do not exceed the rate of change limit.

The load preferably comprises a responsive load or loads that is or are controllable to draw power at variable times. The store, for example, has a primary function to provide power backup for an energy critical facility but has capacity to provide variable storage to the balanced string while maintaining its primary function.

The control means can provide preference parameters to the responsive load to influence the load to draw power at preferred times or not draw power at other times and the load may be responsive to the parameters to decide when to draw power. The control means provides preference parameters to the store to influence the latter to draw power at preferred times or not draw power at other times and the load is responsive to the parameters to decide when to draw power. In this way, the local control of the load or store controls the load or store to perform its primary function and the control means do not alter the control steps of the local control but merely influence those steps. For example, in the case of a load that operates to heat or cool a body, the load may have a local controller that controls the load to operate within a critical temperature range between temperatures T1 and T2. The local router may be adapted to receive the parameters from the control system and to cause the load to actively prepare for a future peak by driving the temperature to one end of the temperature range. Alternatively or in addition, there may be a preferred range of temperatures between preferred temperatures T3 and T4 within the critical range. The local router may be adapted to receive the parameters from the control system and to cause the load to actively prepare for the future peak by allowing the temperature to drift outside the preferred range while remaining within the critical range.

An asset may have a local controller for maintaining operation of the local asset within a predefined (normal) range by switching the asset on or off (wholly or partly). The local controller is coupled to the router for the asset and may receive direction from the router influencing the timing of switching, without departing from the predefined (normal) range.

There may be first and second balanced strings, each with separate clusters of loads, sources and stores and having respective first and second controllers and higher level control means for allocating power elements between the clusters.

Preferred embodiments and examples are now described, by way of example only, with reference to the drawings.

DETAILED DESCRIPTION

Figure 1:
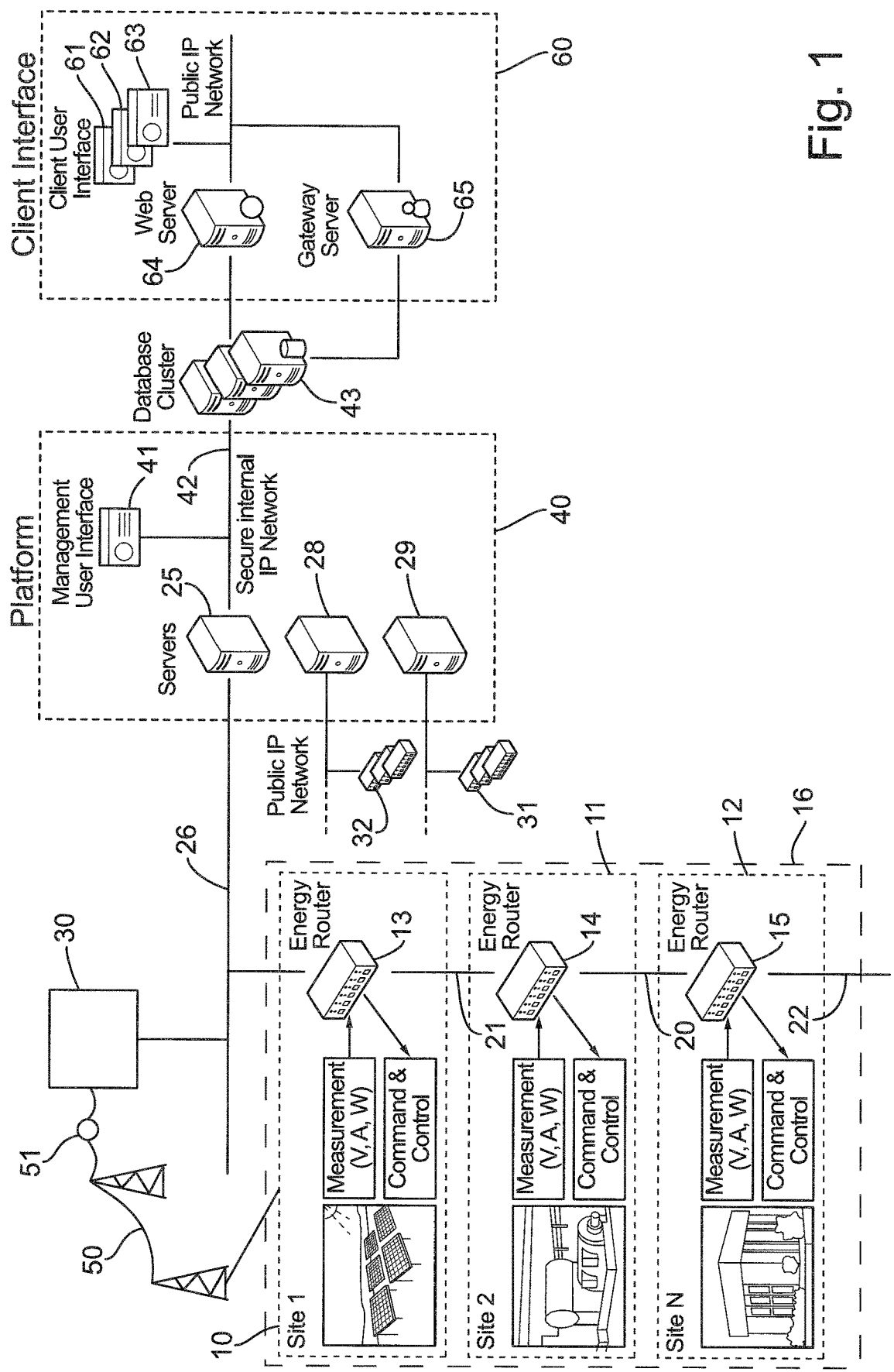
FIG. 1 is an illustration of part of an overall system in accordance with embodiments of the invention.

Referring to FIG. 1, a system is illustrated showing a number of discrete sites 10, 11 and 12, each having an energy router, 13, 14 and 15 respectively. The energy routers are illustrated as being connected to each other by IP connections 20 and 21 and being connected to a server 25. Other sites may be included with routers connected to routers 13, 14 and 15. Sites 10, 11 and 12 together form a "balanced string" 16. There may be additional sites connected by connection 22 in the balanced string. In an example, site 10 may be a power source, such as a solar farm, site 11 may be a responsive load, such as a thermal load (heating, air conditioning, refrigerating or other thermal load) and site 12 may be a storage site to be described below.

Additional balanced strings and other clusters, such as string 30 and clusters 31 and 32 may be connected to server 25 across IP network 26. Clusters 31 and 32 (which are preferably also balanced strings) may connect to server 25 or to other servers 28 and 29. Together servers 25, 28 and 29 form a control platform 40 under the management of a management user interface 41. The servers connect via a secure internal IP network 42 to a database cluster 43. This database cluster contains extensive information about all the available sites in the system, with detailed parameters of those sites in terms of their energy requirements and capabilities, as well as details of the energy grid connecting these sites together and connecting these sites to other clusters such as clusters 31 and 32. For example, the database contains, for each asset: (i) its topological position in the power grid relative to other power assets, (ii) its power needs or delivery capability, and (iii) parameters indicative of how flexible are those power needs or capabilities. The database may store time characteristics of the power needs or capabilities and flexibility parameters. It may additionally store parameters reported by the power assets indicative of real time needs or capabilities and permissible variations on those needs or capabilities.

By way of example, the grid 50 supplying power to sites 10, 11 and 12 and to cluster 30 may have a pinch point 51 in the form of some connection, substation or switch, which has a particular rating specification or limit. Such information is stored in database cluster 43.

A client interface 60 is provided for client users 61, 62 and 63 to access a web server 64 (with, optionally, a gateway server 65). The client user interfaces 61 to 63 connect by the public IP network to the web server 64.

In operation, site 10 generates power and feeds this power to the grid 50. Site 11 consumes power, which it draws from the grid 50 and site 12 stores power from the grid 50 or delivers power to the grid 50, as will be described. In operation, sites 10, 11 and 12 are balanced by the control of server 25 so that these sites work together at a local level exchanging energy of a peer-to-peer basis to locally balance the electrical system so that it effectively works like a micro-grid and has no net flows of energy in or out of the grid 50 or maintains a steady net flow of energy in or out of the grid 50 and balances fluctuations that would otherwise need to be supplied from a rapid response power station in the grid 50. By a "steady net flow of energy" is meant a flow of energy that has a rate of change that does not exceed a certain upper limit, for example 50 MW/min (being a rate at which an open cycle gas turbine, OCGT, is necessary), and more preferably does not exceed 8 MW/min (a rate of change that calls for a coal fired generator or an OCGT or other responsive generator). By balancing the requirements and capabilities of sites 10, 11 and 12, the ramp rate of demand on the grid 50 is kept at a base level, at which long-term slow-changing power sources such a nuclear generator can maintain a steady net flow of energy.

Similarly, balanced string 30 comprises a mixture of two or more of the three types of site: sources, responsive loads and stores. Thus, balanced string 30 similarly maintains a controlled rate of change of demand from (or supply to) the grid 50. Notice that by maintaining these separate balanced strings on each side of the pinch point 51, the specification at that point is satisfied. The pinch point 51 may be a substation or a feeder (i.e., a cable from substation to substation, or from substation to load). It may be permanent or temporary. E.g., a fault may be reported indicating some rating limitation in a distribution cable that is only a problem under particular circumstances. This fact, the logical location of the fault, the limitations and the circumstances may be stored in database 43.

Controller 25 supplies parameters to routers 13, 14 and 15, influencing the manner in which those routers control their respective sites to provide or demand power (details of which are described below). Additionally, server 25 allocates sites to balanced string 16 or balanced string 30, or removes sites from those respective balanced strings, according to longer term fluctuations, described in greater detail below.

The platform 40 is able to control servers 25, 28 and 29 to in turn influence various balanced strings within their domains to achieve overall objectives, such as reduction of peaks in demand or temporary redistribution of supply and demand, for example in times of grid maintenance. The servers 25, 28 and 29 have access to the data on the database cluster 43.

As new sites wish to benefit from the platform 40 they can be added by means of management user interface 41. Details of the respective energy assets or loads can be entered into the database cluster 43. Database cluster 43 also stores any trading related data such as peak and off-peak energy prices. These may be fixed (from year to year or month to month) or dynamic (changing from hour to hour). In either case, they will influence the parameters sent from the server to the routers in any given cycle. In the case of dynamic pricing, a change of pricing may trigger a new cycle of parameters from the server to the routers.

Figure 2:
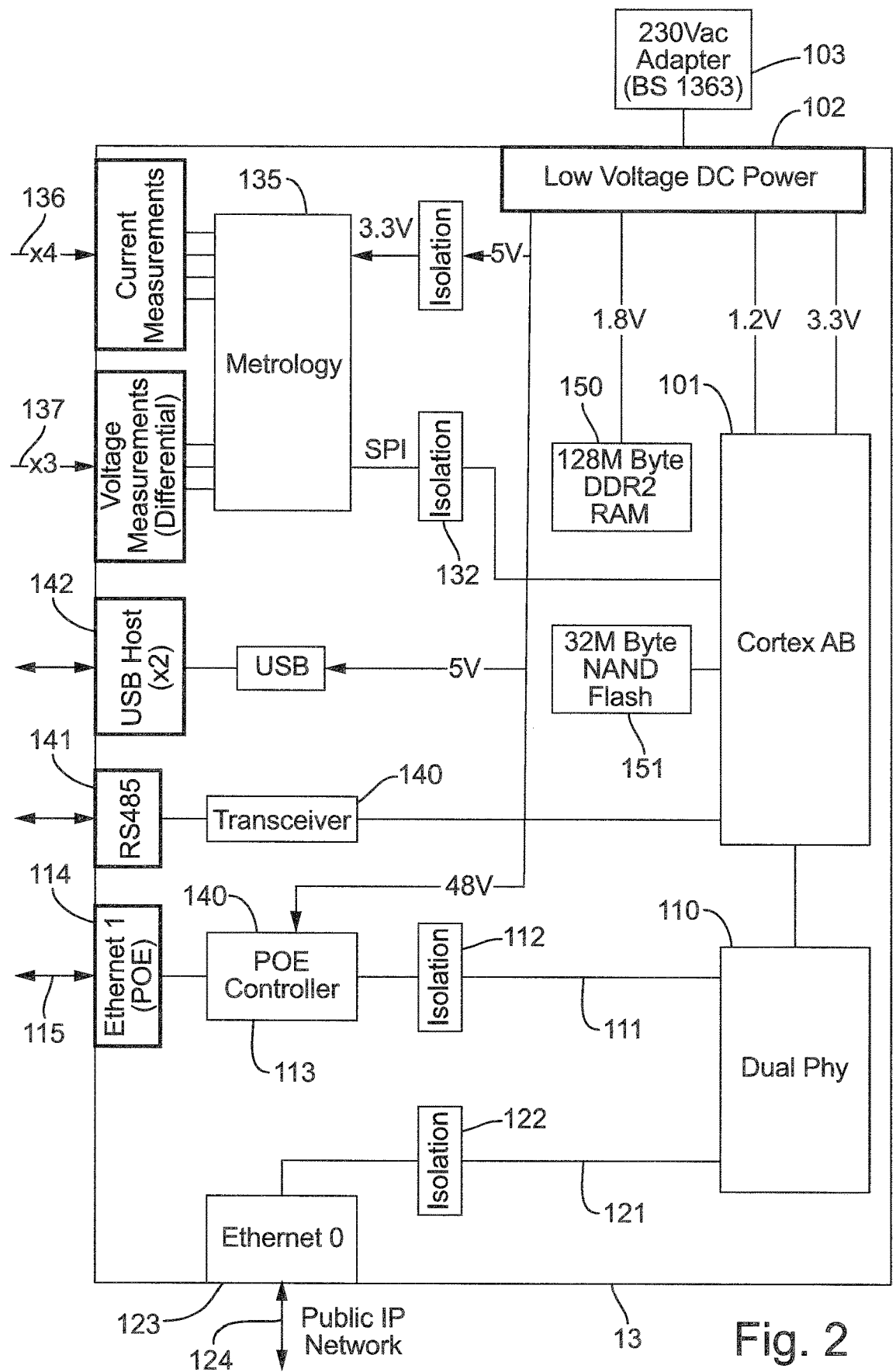
FIG. 2 is a diagram illustrating an implementation of an energy router of FIG. 1.

Referring now to FIG. 2, an example of an embodiment of router 13 is illustrated. It has a universal architecture, suitable for use as router 14 or 15 or in any one of balances strings/clusters 30, 31 or 32. It has a number of aspects provided to give it universal application, not all of which are used in any one site.

The router 13 comprises a processor 101 (for example a Cortex A8™ processor available from ARM). It receives DC power from a low voltage DC power adaptor 102 that is connected to a 230V AC adaptor 103. Connected to the processor 101 is a dual ethernet physical layer integrated circuit 110, adapted for standard ethernet communication. It has a first port 111 connected via an isolator 112 to a power-over-ethernet (PoE) controller 113. The PoE controller 113 is adapted to pass electrical power along with data onto an external electric cable 115 connected to the port 114. This allows the cable 115 to provide both data connection and electric power to external devices. The second port 121 is connected via isolation circuit 122 to a second ethernet port 123 that is connected to a public IP network 124. Also connected to the processor 101, via isolation circuitry 132 is a metrology input circuit 135 that has four current measurement inputs 136 and three differential voltage measurement inputs 137.

The processor 101 additionally has a transceiver 140 for communication with a communications port 141 in accordance with the RS 485 standard and two USB host ports 142. Random access memory 150 and flash memory 151 serve the processor 101.

In operation, the router 13 has an IP address allocated to it for the purposes of public IP network 124. This IP address is communicated to or provided by server 25. Through ethernet port 123 (or port 114) the router 13 receives high-level instructions or parameters from server 25. Examples of high-level parameters are:

{peak demand; t1; t2}
{peak demand; t3; t4}
{peak supply; t3; t4}
{voltage; t3}
{line frequency; priority A}
{line voltage; priority B}
{emergency; t4; t5}
{rate of change of power; t6; t7}.

In these examples:

<peak demand> is an anticipated level of current (or current deficit) that the grid 50 expects to have to supply (either to the cluster 16 or some other entity) between times t1 and t2 or between times t3 and t4, and note that the former may be an immediate demand whereas the latter is a future demand;

<peak supply> is an anticipated level of excess current that the grid 50 expects to have available between times t3 and t4;

<voltage> is an anticipated drop in voltage at time t3 (or an anticipated increase in voltage at time t3)

<priority A> is a priority value (e.g., from 1 to 10) to be associated with maintaining line frequency (e.g., between certain times)

<priority B> is a priority value (e.g., from 1 to 10) to be associated with maintaining line voltage (e.g., between given times);

<emergency> indicates a highest level of priority or an over-riding priority between times t4 and t5 and is usually accompanied by some other instruction or parameter;

<rate of change of power> indicates a maximum rate of change of power flow through a specified point in the grid, between times t6 and t7.

It may be noted that server 25 is not necessarily giving direct commands to individual sites 10, 11 and 12 to draw power or cease drawing power, but it is giving indications to the balanced string 16 as to how platform 40 would like balanced string 16 to behave at certain times in the near future, e.g., in terms of meeting the needs of the grid by drawing less power or by providing more voltage, or in terms of prioritising behaviour at future times (e.g., in terms of current to be drawn, or rate of change of current, or need to maintain line voltage, or need to maintain line frequency).

The router measures, through metrology inputs 136 and 137, present levels of voltage and current, for example present voltage and current being supplied by site 10 to grid 50, or being consumed by site 11, or being supplied or absorbed by site 12.

Connected to Ethernet port 114 by ethernet cable 115 is a local area network for the site in question. Over this network the processor 101 can send local commands to control power consumption or power generation or power absorption by the site in question.

In operation, the router 13 stores, in memory 151 (or elsewhere) local control parameters. These may be many and varied dependent on the site, but, for example include critical operating parameters of the site, such as: a need to maintain a minimum temperature or a maximum temperature; or a need to maintain a minimum level of back-up battery charge; or some other parameter that is critical to the operation of the site and should not be interfered with from outside. As well as critical parameters, the local parameters may included preferred (non-critical) parameters. For example, there may be a preferred range of operation within a wider critical range of operation, or there may be a critical range of operation and flexibility parameters indicating that operation may depart from the critical range by a limited degree for a limited period of time. Also stored in memory 151 (or elsewhere) are parameters in the nature of priority parameters (e.g., peak and off-peak power prices), which guide or determine the operation of the site 10 in the absence of any alternative parameters from the platform 40. Thus, for example, the local controller (not shown in FIG. 2) may control adaptive load 11 to preferentially consume energy at off-peak times.

In operation, the controller 101 performs a comparison between (i) the high-level parameters being received from the server 25 and (ii) the local parameters stored in memory 151 and measurements measured through metrology circuit 135. Where controller 101 identifies a mismatch between local measurements of the metrology circuit 135 and high level objectives of the server 25 and/or mismatch between priorities provided by the server 25 and local parameters from the memory 151, the processor 101 acts to issue commands over ethernet connection 115 to override local control of the site in a manner that is driven more by the overall parameters from server 25 and less by the local interests of the site as determined by local parameters. Examples will be given below.

Figure 3:
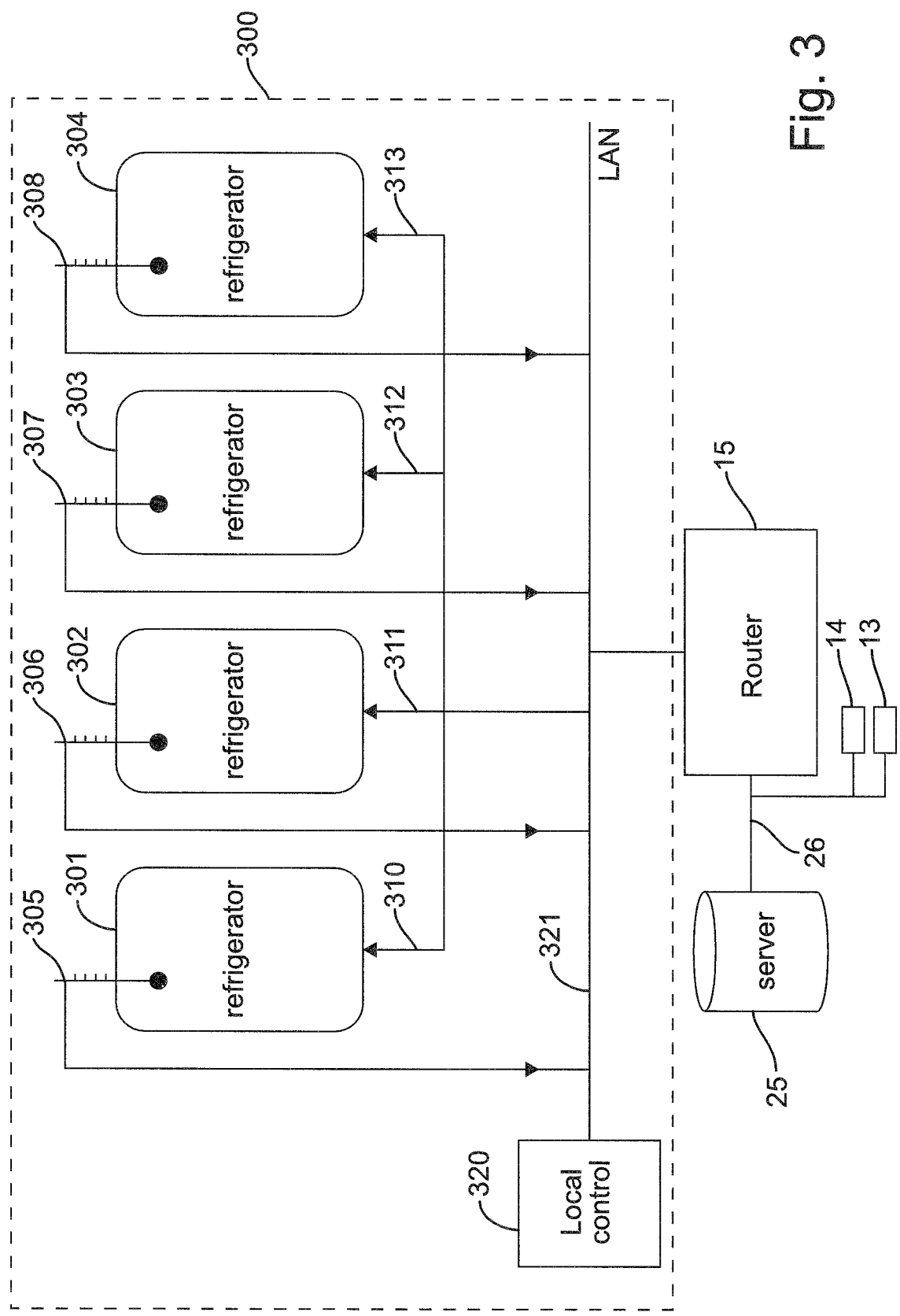
FIG. 3 illustrates an example of a storage site under the control of an energy router such as that of FIG. 2.

Referring now to FIG. 3, an example of site 11 is shown. This site is an example of a responsive load. In the example of FIG. 3, the responsive load is a refrigeration warehouse 300 that comprises a number of large refrigerators 301 to 304, each having a temperature sensor 305 to 308, and each having a control input 310 to 313. The temperature sensors feed their measurements to a local controller 320 via a local area network 321. The local controller 320 controls the inputs of the refrigerators 310 to 313 through the same local area network 321. Coupled to the local area network 321 is a router 15 that is coupled over a public IP network 26 to server 25.

In normal operation of the site 300, the local controller 320 provides commands to the inputs 310 to 313 of the refrigerators 301 to 304 to drive their compressors when the temperature of any one of them rises above 5° C., as measured by the temperatures sensors 305 to 308. When the temperature drops to 2° C., the local controller 320 stops the compressors, allowing the temperatures of the refrigerators to rise to 5° C., whereupon the cycle begins again. The local controller 320 controls each of the refrigerators 301 to 304 independently, so that no one of them rises above 5° C., at which temperature (for example) the contents of one of the refrigerators may be ruined. In the case where the refrigerators are freezers, they may be maintained in a lower temperature range, for example −2° C. to −4° C. If the temperature of any one of them rises above the upper limit (or rises above the upper limit for more than a predetermined period of time), its contents may have to be destroyed. This is the most basic local operation of the site 11, upon which there are a number of variations. For example, the local controller 320 may have timing instructions to preferentially drive the refrigerators during periods of off-peak (low cost) electricity. Off-peak times are, typically, between 10 pm and 8.30 am (Scotland) or 11 pm to 7 am (London), but times will differ depending on the supplier. Off-peak energy may be priced at, for example, half the regular price. Typically, the local controller 320 is programmed with the start and end times of the off-peak period. Thus, the local controller 320 may be programmed to drive the compressors during the off-peak period even where the temperature has not reached its upper limit.

Instead of a refrigeration plant, the local site may be some other responsive load such as a swimming pool or air conditioned warehouse. For example a municipal swimming pool might have a standard temperature range of 28-32° C. If that temperature is allowed to drop overnight/in the morning to 28° C. then the additional solar energy over the midday period can be used to increase the temperature to 32° C.—using the pool as a thermal energy store. Similarly an industrial refrigerator may have an operating range of 2-5° C. Before the solar peak, that temperature would be allowed to rise to 5° C., then would act as a dispatchable load and be reduced to 2° C.

The local controller 320 has a local control program that controls operation of the site to (i) maintain operation within critical parameters and (ii) do so in a manner that optimises use of off-peak power, but the local control program can be influenced or overridden by instructions from router 15. (Note that in the refrigerator case, the lower limit of temperature is critical, because the contents cannot be allowed to freeze, and the upper limit is also critical, because the contents may perish, but in the freezer example, it is the upper limit that is critical, because the contents cannot be allowed to thaw, while the lower limit may not be critical.)

Router 15 receives parameters from server 25 to influence the operation of the site 300. For example, the router 15 may receive a priority parameter from server 25 indicating some higher priority that is important to the power supplier and not inconsistent with the pre-programmed parameters programmed in local controller 320 that are important to the user of the site. Priority may equate to price (i.e., unit cost of electricity) or may be related to value (in particular value to the grid operator).

As an example, within the regular day-time cycle, there may be a particular peak period at which the grid operator would prefer that the site 300 does not draw power. This is not built into the pricing structure or timing parameters stored in local controller 320, but allows the router 15 to cause the controller 320 to operate in a different manner. For example, where the router is made aware that there is a peak period coming in the future, the router 15 can prepare the site 300 so that it will not draw current during that peak period. It does so by causing the local controller 320 (or directly commanding) the refrigerators 301 to 304 to drive down operation temperature in advance of the peak. This ensures that none of the refrigerators reaches its upper limit during peak time and therefore ensures that the load 300 as a whole will not draw power during the peak period. This example can be referred to as predictive preparation of the load. Note that the load is not merely responding to present conditions, nor is it merely a scheduled load that performs its function at convenient times or refrains from doing so at inconvenient times. It is now actively being prepared to be in a state in which it can absorb/utilize power at time when it is predicted that a load (indeed a responsive load) will be required.

The router 15 may be authorised to completely override the local controller 320. For example, where the grid operator anticipates catastrophic failure of a key component in the grid (e.g., a generator) and needs to shut down that component in order to perform cost-saving maintenance, it may be that the interests of the grid operator override those of the local user (by agreement between the two), in which case the router 15 can issue an instruction to selectively cease supply of power to one or more of the refrigerators 301 to 304 (e.g., one by one). This would be achieved by the server 25 issuing a priority parameter of the highest level to the router 15, which the router 15 recognises as a mandate to disconnect power from the refrigerators.

The site 300 may be part of a balanced string (e.g., sites 10, 11 and 12), in which case the router 15 is connected to other routers 14 and 13 of other sites in the vicinity over the public IP network 26. Considering now, for example, a situation in which the router 13 is connected to a solar farm, the solar farm will typically have a peak generation period around midday. The router 15 is now able to override the controller 320 to cause the controller to preferentially draw power during the midday period, rather than the off-peak period (the latter being the period during which the local controller is programmed to respond). Similarly, the router 15 can allow the temperatures of the refrigerators 301 to 304 to rise in the period approaching the peak of solar energy, thereby predictively preparing the load 300 to absorb energy during the anticipated peak.

Alternatively, the router 15 may be made aware by the server 25 (or by the router 13) that it is a cloudy day and the anticipated peak will be at a lower level. In this case the priority parameter given to router 15 between the solar peak times may be a lower priority, in which case the router 15 forms a calculation, comparing the local priorities of the local controller 320 (e.g., regular and off-peak prices) with the priorities being given to it by the server 25 or the router 13 and may perform a calculation as to whether to drive the load 300 during the solar peak, or allow the load 300 to continue under local control until the start of the grid off-peak time. The router 15 may calculate a time during the falling period of solar power at which it is no longer the priority to drive the load using solar power, but higher priority to allow the load to continue under its local control 320.

Figure 4:
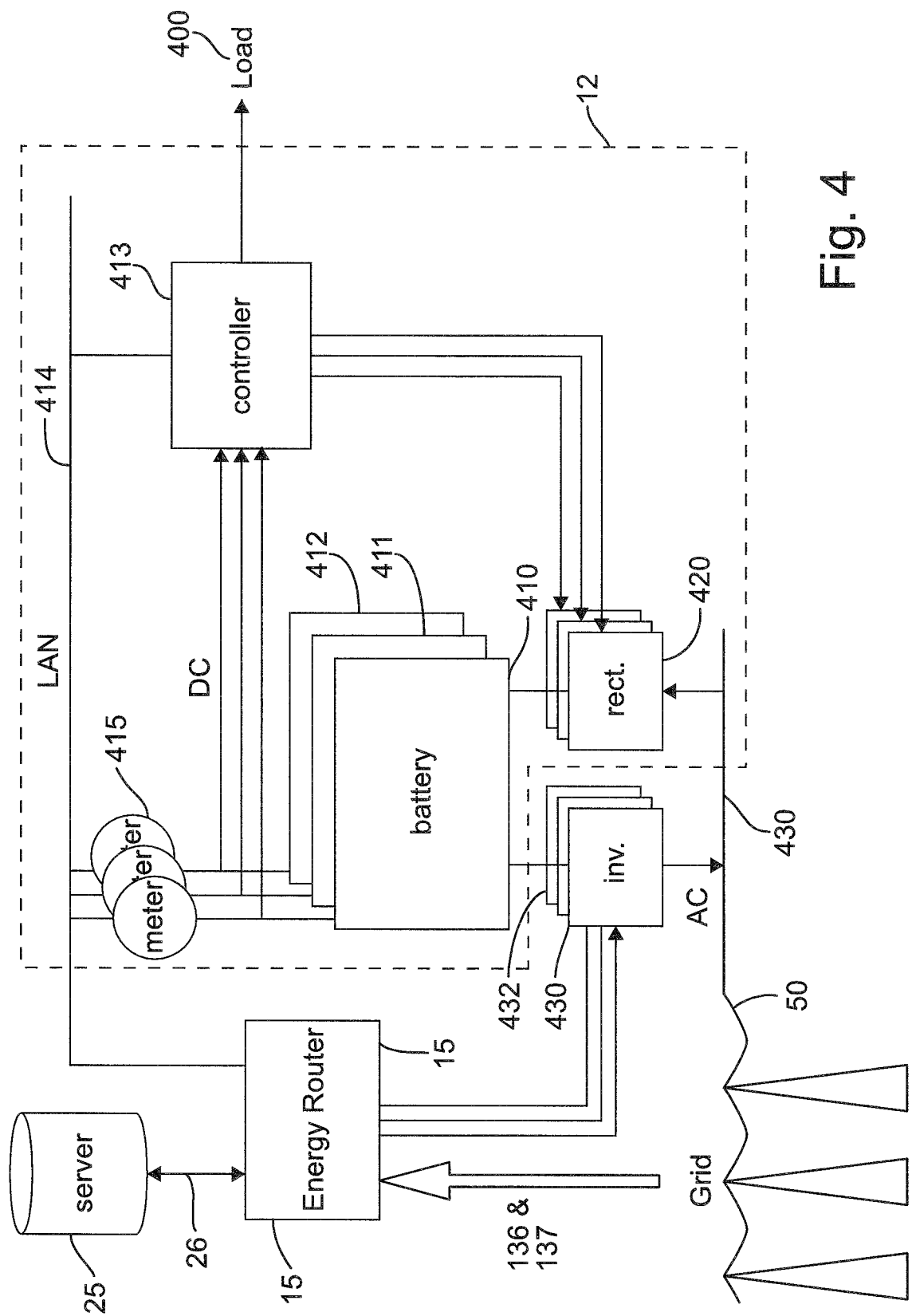
FIG. 4 is an illustration of a responsive load.

Referring now to FIG. 4, details of an example of an energy storage site 12 are illustrated. In this example, the energy storage site 12 has a primary function as, for example, a critical data store or a telephone switch or interchange, represented by the load 400. The load 400 is connected to the grid 50, but has such a critical function that it requires continuous 24-hour battery backup. This battery backup is supplied by one or more batteries 410 to 412. In normal operation, the batteries are not required. A controller 413 is provided connected to voltage meters or current or power odometers 415 and to rectifiers 420 that are coupled to a source of mains AC power 430 derived from the grid 50. There may be step-down and step-up transformers, stepping the mains power down from 240 volts to a suitable battery voltage and stepping the battery voltage up to the necessary voltage to drive the load 400, but these details are not shown.

Also connected to the battery or batteries 410 to 412 is or are one or more inverters 430 to 432 that have an AC output connected to the grid 50. The inverters 430 to 432 are connected to outputs of the router 15. Metrology inputs of the router 15 (136 and 137) are connected to the grid 50 or the AC input 430.

Operation will first be described in the case where there is just a single battery. In this case, the battery may supply, for example, a single telephone switch. The local controller 413 is programmed to maintain the battery charge above a lower threshold ($C_l$). Depending on the technology of the battery, this may require that the controller 413 merely "tops up" the battery charge from time to time. Thus, controller, 413 may be provided with upper and lower limits (e.g., $C_u$ and $C_l$ or $V_u$ and $V_l$) representing limits of charge or voltage within which the controller will operate in normal operation, in a hysteresis control loop.

It has been identified that even within these limits, there may be substantial charge capacity in the battery 410 that can be utilised for other purposes. Additionally, or in the alternative, it may be useful to allow the battery 410 to discharge to a lower level ($C_{12}$ or $V_{12}$) and recharge. This may extend the life of the battery. To this end, energy router 15 overrides or influences the local controller 413 to discharge the battery 410 through inverter 430 into the grid 50. The router 15 causes this discharge at times that are priorities given by the server 25 (or priorities from other routers in a balanced string). The controller 413 can top up the battery 410 when the needs of the grid 50 have ended or when some other priority to the local controller overrides (e.g., the commencement of off-peak power period). Alternatively, the energy router 15 can provide a priority parameter to the controller 413 to cause the controller 413 to activate the rectifier 420 to draw power from the grid at a priority time that is governed by the router 15 (e.g., during a period of solar peak indicated to the router 15 by the router 12). Alternatively (not shown) the router 15 can be connected directly to the rectifiers 420 to instruct those rectifiers to deliver charge to the battery 410 within the limits of the meter 415 as read directly by the router 15 through the LAN 414.

The example will now be considered where the site 12 has multiple batteries. This is a typical scenario, because the battery technology may require complete discharging and recharging of each battery from time to time, yet the load must always have at least one battery (typically several) available to provide charge in the event of failure of the AC supply 430.

In this scenario, the controller 413 in a cyclical manner (e.g., once per day or once per week) allows one of the batteries 410 to 412 to discharge into the load 400. Once discharged, the controller 413 causes that battery to recharge through its respective rectifier 420. In this scenario, there is additional battery storage capacity that can be made available by the router 15 to the grid 50 for priorities that are determined by the router 15 rather than the controller 413. Thus, for example, the router 15 can influence or override the choices made by the controller 413 in terms of when to discharge a battery and when to recharge that battery. Thus, the energy router 15 can provide a priority parameter to the controller 413 (or a time parameter or both). As an example, the router 15 can prioritise discharge of one of the batteries during an evening peak of demand on the grid 50 and can prioritise recharging of the battery during a midday peak of solar supply from the grid 50.

As another example, a battery store of this nature is a particularly fast responding source of energy. The energy router may prioritise discharge of one of the batteries through the inverters into the grid during a time of phase deceleration in the grid, i.e., during a time when the metrology inputs 136 and 137 indicate falling grid frequency (indicative of a sudden increase in demand and an inability for supply to keep up with demand). The battery can rapidly discharge into the grid to meet this immediate need for acceleration of supply to the grid, thereby maintaining phase (and frequency) and thereby avoiding the need to call upon high-rate generators such as gas turbine generators.

This ability to respond to demands of the grid 50 can allow the site 12 to operate in conjunction with sites 10 and 11 to limit the rate of change of power demand within the balanced string 16. This is a particularly valuable feature, because it has wider impact on the need of the grid operator to provide expensive power generating facilities that have the necessary responsiveness.

Figure 5:
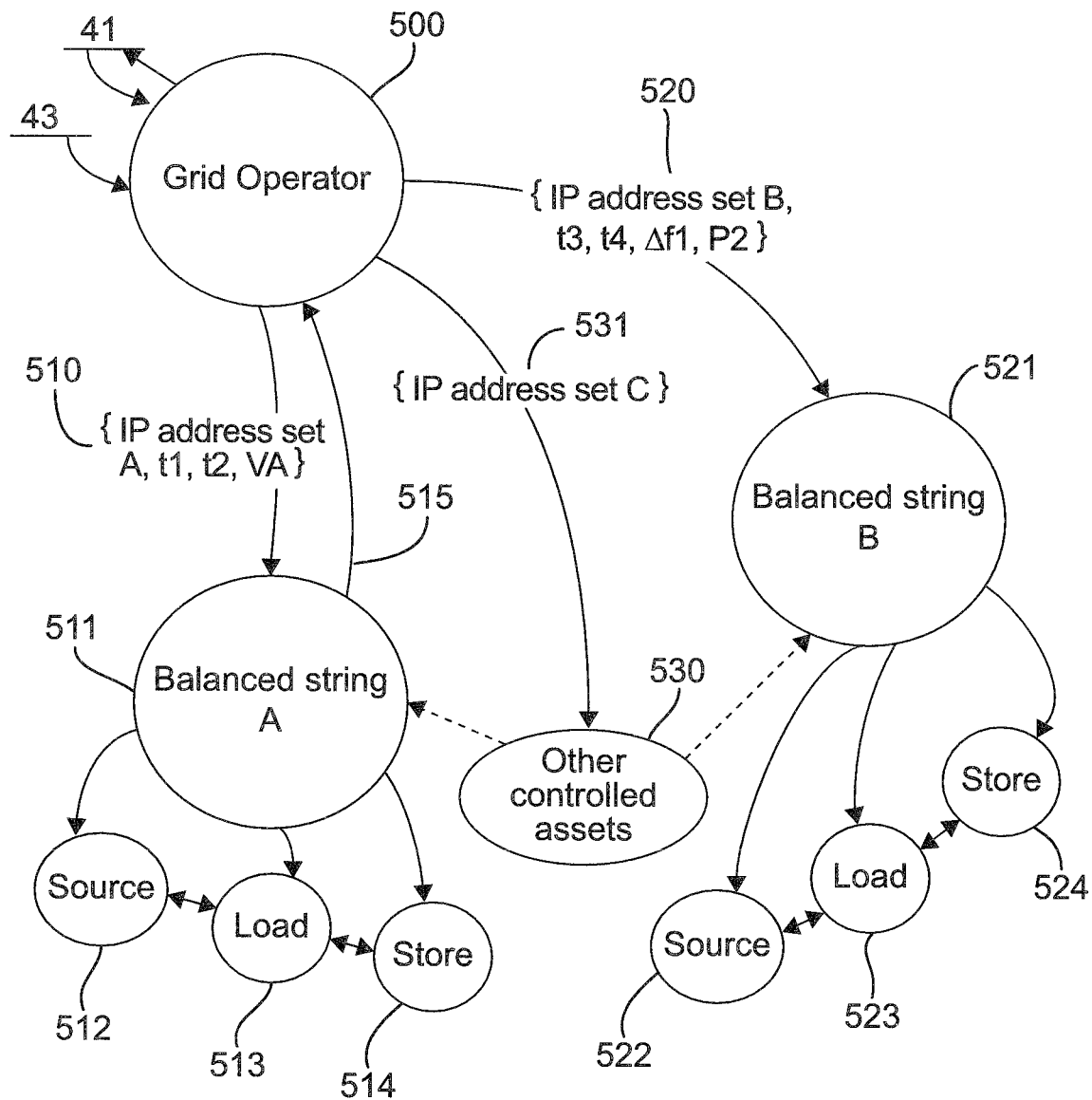
FIG. 5 is a process diagram illustrating processes running on different elements of the system of FIG. 1.

Referring now to FIG. 5, a process flow diagram is shown, demonstrating some of the processes that are run on the various elements of the system of FIG. 1. On the platform 40, a grid operator process 500 is carried out. This process can, for example, run on server 25 and receives inputs from user interface 41 and delivers information to that user interface. It also receives data from database cluster 43 and may provide updates to that data. Process 500 provides high level parameters 510 to process 511. Process 511 is preferably performed on each of routers 13, 14 and 15. Process 511 is the process that manages the balanced string 16 and has sub processes as follows: a source process 512 performed by energy router 13; a load process 513 performed by energy router 14; and a store process 514 performed by energy router 15.

In a similar manner, grid operator process 500 may provide another set of parameters 520 to balanced string process 521, which is a process run for another balanced string such as balanced string 30 (shown in FIG. 1). Balanced string process 521 has corresponding sub processes, for example sub-processes 522, 523 and 524.

As has been explained above, processes 511 and 521 ideally have all three of source, load and store processes, but may have only two of these processes and indeed may well have multiple sources, multiple loads and/or multiple stores, each having a corresponding process. There may be other controlled assets in the network (not necessarily shown on FIG. 1), having energy routers and these are illustrated as having a corresponding process 530. Process 530 receives parameters 531 from grid operator 500. Each of the processes shown can return data or instructions 515 to a process at the higher level.

By way of example in operation, the grid operator 500 provides a set of addresses and parameters 510 to balanced string 511. The set of addresses are, for example, a set of IP addresses. They define the members of balanced string A. They inform each member of the string what other members make up the string. The parameters for that string define the high-level aims for the string. An example of parameters might be {t1, t2, VA}. In this example, the grid operating process 500 is indicating to the balance string 511 that between times t1 and t2, a certain priority level should be given to power (i.e., voltage×current). This may indicate, for example, a level of influence on process 511 in respect of the amount of power that balanced string will draw from the grid between times t1 and t2. The balanced string process 511 passes these parameters (or derived parameters) to the various routers 13, 14 and 15 in the balanced string 16 and the corresponding processes 512, 513 and 514 work together (in a manner further described below) and in the course of their operation, they will be influenced between times t1 and t2 in terms of their maximum power drawn from the grid. This influence may result, for example, in drawing no more than a certain level of power (e.g., as indicated by parameter VA) from operator process 500 or may result in exceeding that level. In either case, there may be financial indications for achieving the wishes of the grid operator process 500, or for failing to achieve those wishes.

The balanced string process 511 can report to the grid operator process 515 (i) whether or to what extent it expects to be able to achieved the desired intention between times t1 and t2 and, later, (ii) whether or to what extent it has been able to achieved the desired intention between times t1 and t2. Grid operator process 500 can log these results and report to a user.

Similarly, balanced string process 521 may be defined by IP address set B and may be given the same or another set of parameters 520. In the example given, the parameters 520 indicate that between times t3 and t4 balanced string process 521 should attempt to maintain the grid frequency within a deviation $\Delta f_1$ of nominal grid frequency, and should allocate this aim a priority level P2. Balanced string process 521 will provide these or derived parameters to source process 522, load process 523 and store process 524 and these processes will work together to attempt to maintain grid frequency within the specified deviation between the specified times. The degree to which expect to and are able to contribute to this aim is reported back by balance string 521 to grid operator 500.

In the course of operation, the grid operator process 500 may identify that balanced string A has insufficient responsive source assets or responsive load assets or available storage capacity to achieve the aims of the grid operator process 500. For example balanced string A may be out of balance, in the sense that it is unable to maintain its rate of change of demand (from the grid) or supply (to the grid) below a given threshold. In order to bring balanced string A further into balance, grid operator process 500 needs to allocate additional assets to balance string A. It does this by issuing a command 531 to one of the assets 530. This command may, for example, comprise a set of IP addresses, indicating to a router within the controlled asset 530 that it is now a part of the balanced string 16. In other words, the asset (source, load or store) in group 530 is provided with the set of IP addresses (IP address set C) of the other members of its group (routers 13, 14 and 15 which are running processes 512, 513 and 514). When the new asset 530 has these IP addresses, it is able to communicate directly with the other processes in its group and is now part of that balanced string.

At a later time, the same asset 530 can be unallocated from balanced string A and allocated to balanced string B by the same process. In this way, the grid operator process 500 is able, without any connecting or disconnecting of electrical supply, or other equipment, to maintain a level of balance in each of the balanced strings under its control.

This aspect has great advantages. It allows, from a remote point 500, a grid operator to create local clusters of energy loads and resources in a manner such that each local cluster has limited or controlled demands on the grid as a whole. This in turn can reduce the need for the grid operator to redirect power in large volumes or at high rates of change to different parts of the country. In an ideal scenario, one of the balanced strings is entirely autonomous, in that it is able to store all the energy generated within the string and consume that energy at a different time. In theory, such a string could be disconnected from other parts of the nationwide grid.

By way of further example, it is also possible to maintain a zero (or bounded) rate of change of power flow through a specified point in the grid to which the string of assets are connected. A constant, steady or smoothed net flow of energy, for instance, to (or from) a balanced string from (or to) the rest of the grid is often advantageous. This can be achieved by providing parameters {rate of change of power; t6, t7} to a string of assets in the relevant section of the distribution network. Measurements can be taken at the specified point to give feedback to the string or to the server to indicate whether the high-level aim is being achieved. The string of assets can communicate among themselves, or via the server, their respective flexibilities and reach an agreement over how to limit their overall rate of change of power drawn through the specified point.

This aspect may involve assets individually (or collectively) taking steps to prepare themselves in advance to be in a position to be responsive under certain circumstances as and when those circumstances arise.

By way of specific example, one asset may be able to bring forward its peak need for power while another may be able to delay its peak need for power, thereby smoothing out the overall need for power (keeping the total need below a maximum).

By way of further example, in response to a measured surge (in power or demand) the assets may collectively bring forward their demand for power or may postpone their demand. They may negotiate (e.g., pre-negotiate) between themselves which should be the first to respond to a need of a given magnitude so that they do not over-respond and turn a surge in demand into a lull (or vice-versa). In other words, they may pre-negotiate how they will collectively meet a particular high-level requirement from the server if and when local circumstances, as measured by a metrology input circuit 135 (or by some other measuring unit) at a predetermined point in the distribution network, call for a particular response (and act in the pre-negotiated way if and when those circumstances arise).

An example of a responsive source is a combined heat and power (CHP) engine that generates heat and power for the same end point (e.g., a building such as a hotel). Typically a CHP engine runs on gas, hydrogen, diesel or other fuel and generates heat and power in a more-or-less fixed proportion (e.g., 60% heat and 40% electric power). Upon receipt of high-level parameters, the responsive source may prepare itself to be in a position to generate less (or generate more) at a given time in the future. For example, it may generate more power in advance of the given time to warm up the building in anticipation of a peak in supply relative to demand (or a lull in demand) so that when the peak arrives, if can turn down its rate of generation. On the other hand, it may turn down its rate of power and allow the building to cool down in anticipation of a time in the future when it has been told by the server to anticipate a lull in supply (or a peak in demand) at which time it will be ready to increase its rate of generation and contribute electricity to the string or to the grid while using the increased heat to return the building to more normal temperature.

Figure 6:
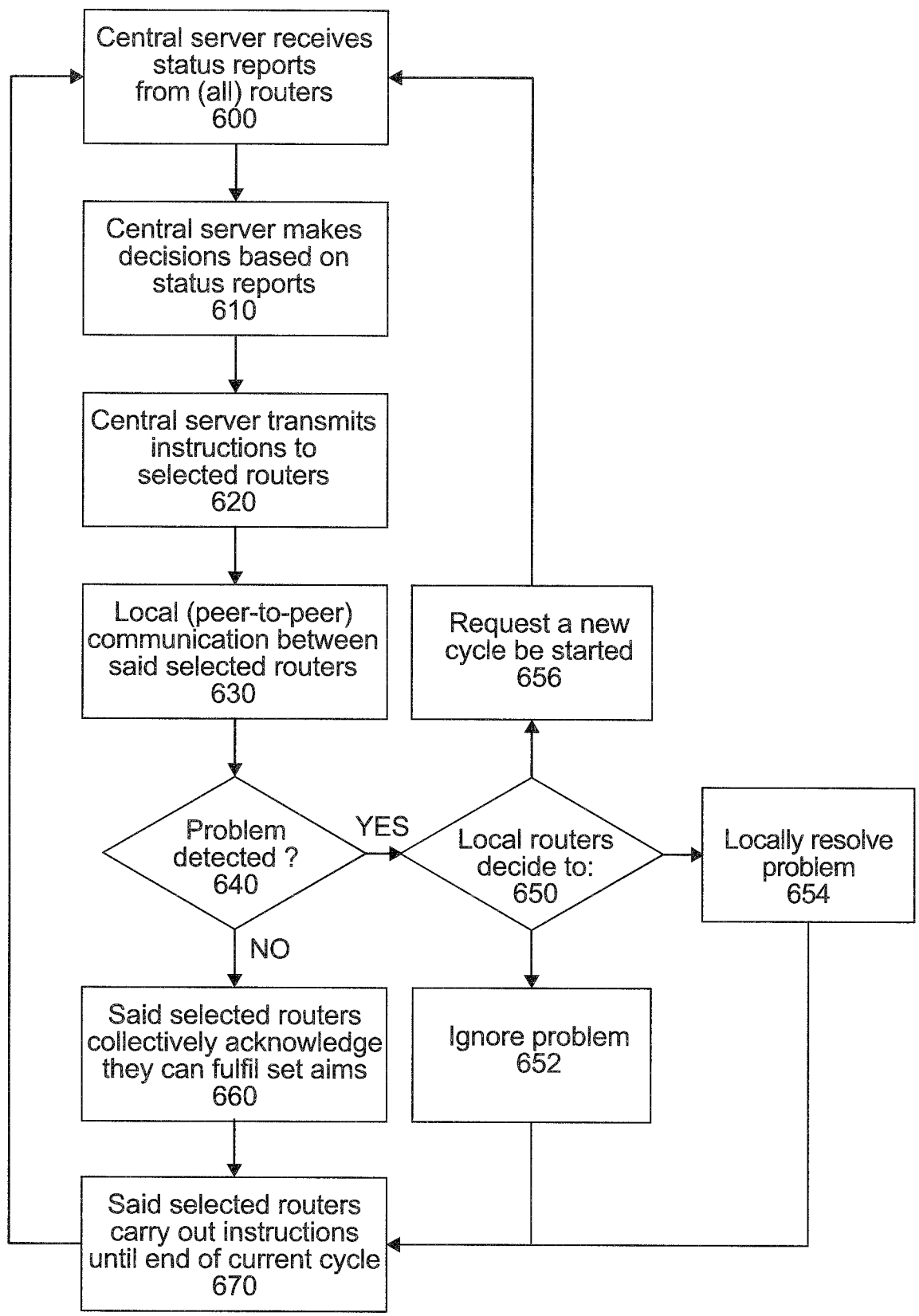
FIG. 6 is a flow diagram illustrating a balanced string allocation process.
Figure 7:
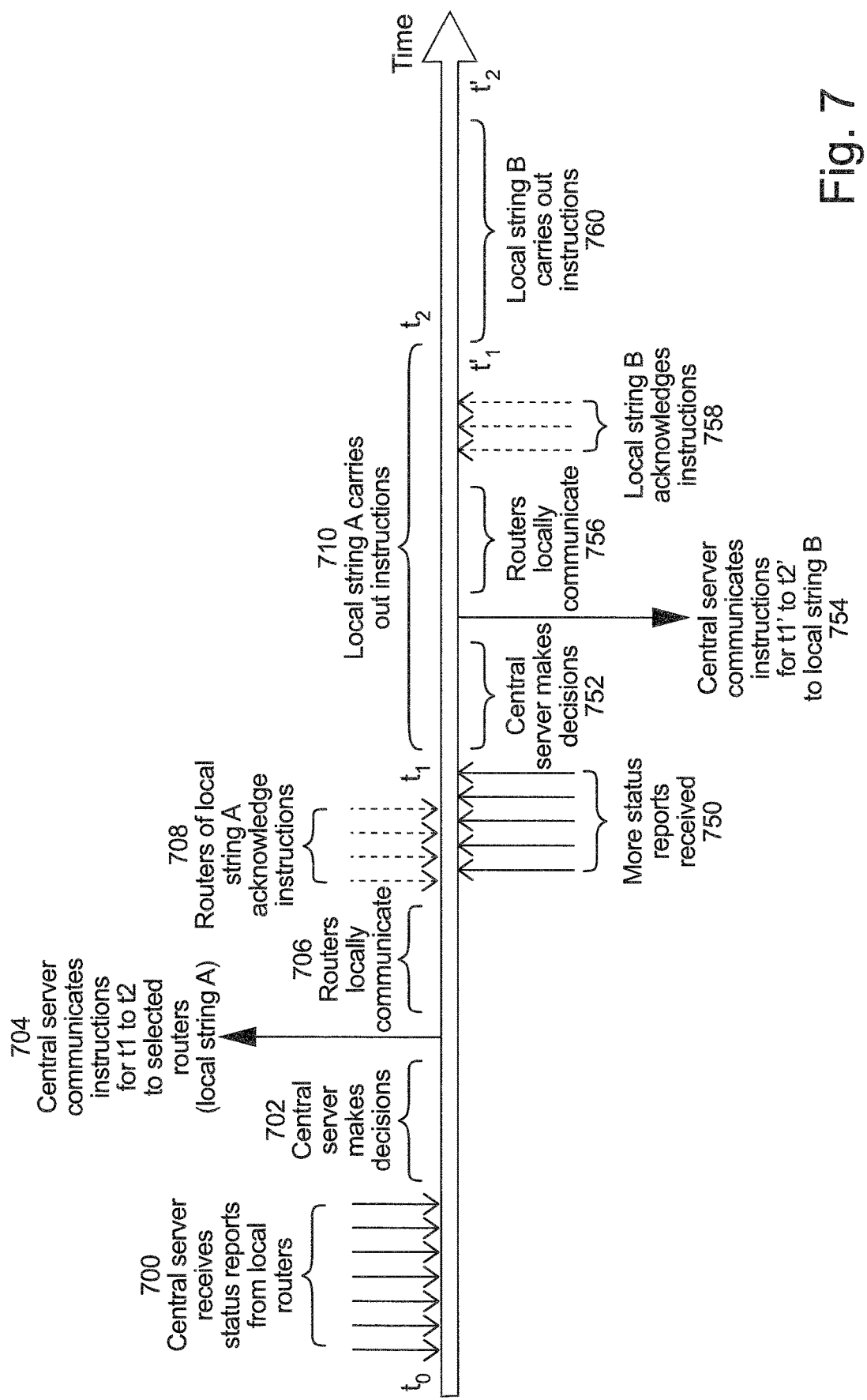
FIGS. 7 and 8 are schematic diagrams showing timelines of a balanced string allocation process involving a central server and local sites and associated routers.
Figure 8:
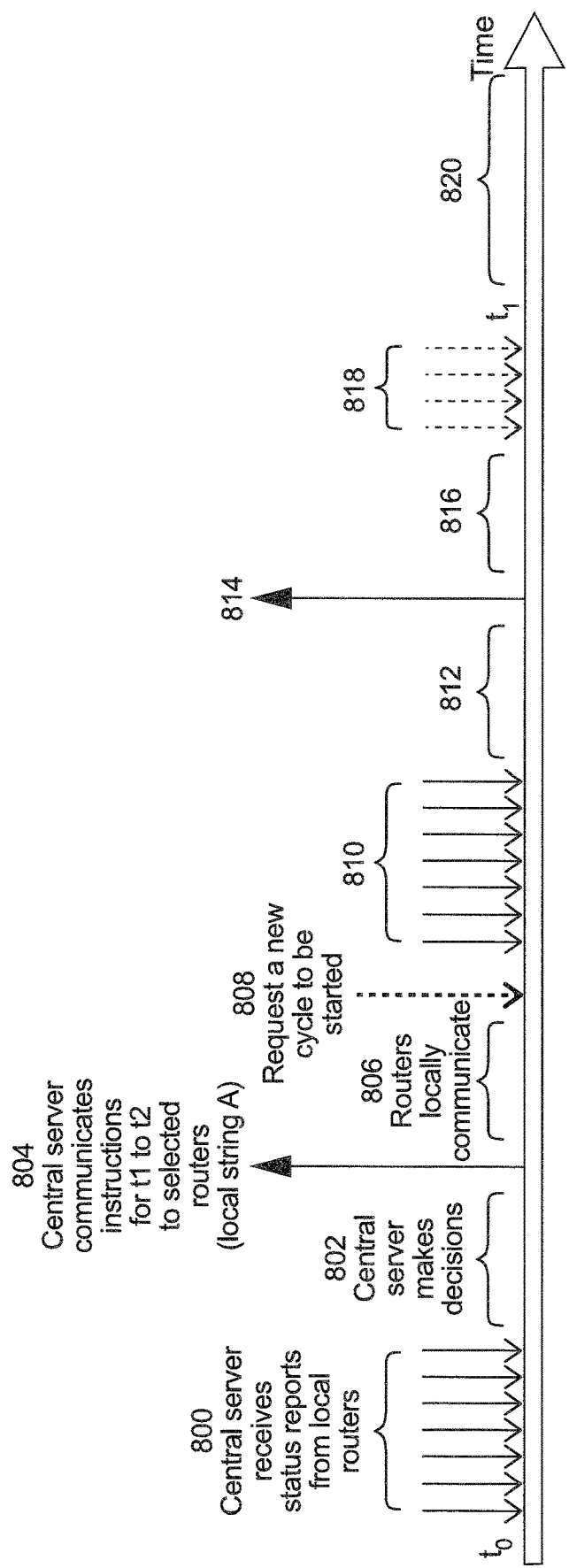

FIGS. 6-8 illustrate a process of balanced string allocation, in particular the communication between the central server 25, the local sites 10, 11, 12 and their associated routers 13, 14, 15. FIG. 6 is a flow diagram showing a process of balanced string allocation. FIGS. 7 and 8 show schematic timelines illustrating a normal situation and a situation in which a problem occurs, respectively, in a process of balanced string allocation.

At step 600 of FIG. 6, a new cycle of a process of balanced string allocation begins at time $t_0$. The central server requests and begins to receive status reports from the local routers (each associated with connected to a local site/asset of power source, responsive load or storage). This step is also illustrated as element 700 in FIG. 7a. A status report from a local site contains updated data about that local site, such as its power needs and delivery and flexibility capabilities. Preferably, status reports are received from all nodes, but they may be received from a subset of all nodes. The status reports are not necessarily received simultaneously; the receiving of status reports can be staggered, irregularly, after $t_0$.

At step 610, the central server makes decisions on forming strings (balanced or otherwise) from local sites, based on the received status reports, in order to achieve high level aims. This is also illustrated as element 702. For example, it may decide to form a local balanced string X with sites A, B and C. The decisions may apply for a specified period of time, e.g., $t_1$ to $t_2$, or periods of time, e.g., $t_1$ to $t_2$ and $t_3$ to $t_4$. The decisions may depend on availability, demand, topological positions in the power grid and geographical topology related to individual or groups of local resources. For instance, the central server may instruct sites D, E and F to form a balanced string based on anticipated energy demand and may instruct sites G and H to not form a balanced string because they belong to different electrical network infrastructures despite their close geographical proximity. As another example, the central server may instruct two solar farms to leave their balanced strings because it is night-time.

At step 620, the central server communicates instructions, based on the decisions it has made, to local routers associated with a selection of local sites. This is also illustrated as element 704. The selection may include a subset or all of local sites known to the central server. For example, the central server may send instructions to the routers associated with sites A, B and C, instructing these sites to form balanced string X.

After the selected local routers receive the instructions, they perform local (peer-to-peer) communication with each other (step 630), but not with the central server, to detect any possible problems. This is also illustrated as element 706. Problems may include indications of corrupted data packages containing instructions or status reports, which may lead to inconsistencies between the instructions received at the local routers, and/or inconsistencies between the actual status of the local sites, the status reports previously sent to the central server, and/or the instructions received from the central server. For example, the central server communicates to a local router an instruction that contradicts the status information the router previously sent as part of a status report. As another example, it is found out that a status report previously sent to the central server is corrupted, due to network problems or other failures, resulting in a mismatch between its reported status and its actual status. As a third example, it is found out that a status report was not sent from the local router, or it was sent but not successfully received by the central server.

At step 640, if no problems are detected by the local routers, the process continues to step 660, where the routers corresponding to selected local sites collectively acknowledge to the central server that they are able to fulfil the aims of the instructions sent by the central server. This is also illustrated as element 708. The process continues to step 670, where the selected routers carry out the instructions. For example, local sites A, B and C form a balanced local string X between time $t_1$ and $t_2$. This is illustrated as element 710.

At time $t_2$, the local routers and sites may follow alternative instructions already communicated from the central server. For example, individual sites are added or removed from balanced strings, forming balanced strings in the period $t_2$ to $t_3$ which are different from the balanced strings in the period $t_1$ to $t_2$. Otherwise, the current cycle ends, the process begins again at step 600, and the central server receives updated status reports from the local routers.

However, if at step 640 a problem is detected, the local routers involved can decide to execute one of at least three options at step 650. One option (step 652) is to ignore the problem detected, for example if the problem is perceived to be unlikely to have a large effect. For example, if one local site out of fifty sites cannot join a balanced string based on an erroneous status report, the routers may decide it is acceptable to carry on with the instructions already received and only rectify the problem in the next cycle. As another example, the local routers may perform peer-to-peer communication and agree to not follow the central server's instructions to include site A in a balance string, and instead to form a balanced string without node A, after realising that site A is actually unavailable.

An alternative option (step 654) for the local routers is to solve the problem locally, i.e., without involving the central server. For example, the local routers may perform peer-to-peer communication and conclude that a previous status report concerning site A was corrupted but that the local routers (including the router for site A) have all the necessary information and that the communications error is non-critical to carrying out of the aims of the server. This option (step 654) has the potential advantage of saving time by solving problems locally without the need to start a new cycle and/or requesting and receiving new status reports and making new decisions. Otherwise, communication latency may delay timely formation of a new balanced string.

A third option (step 656) for the local routers is to send a request, possibly along with a notification about the problem, to the central server, to abort the current cycle and start a new cycle of the balanced string allocation process. In this case, the process goes directly back to step 600, and the central server requests and receives status reports from local routers of local sites again.

Note that an asset may leave a balanced string for reasons other than an error. For example an asset may leave because it is not required to satisfy the high-level aims of the server. In such a case, the other assets in the string confirm their ability to satisfy the aim without the surplus asset, whereupon the surplus asset is free to be allocated to another string to satisfy another need.

The third situation described above is illustrated in the timeline of FIG. 8. Elements 800 to 806 correspond to elements 700 to 706. Element 708 refers to the request made from the local routers to the central server to start a new cycle. This new cycle is implemented as usual, i.e., elements 810 to 818 of FIG. 8 correspond to elements 700 to 708 in FIG. 7.

It is noted that, from the perspective of the central server, more than one cycle of balanced string allocation can be ongoing. For example, as shown in FIG. 7, the central server can request and receive additional status reports from all or a selection of local routers (element 750). The central server may make new decisions which may or may not affect previously made decisions (element 752). Elements 754, 756 and 758 illustrate an example in which the central server communicates instructions to a selection of local sites and routers to form a local string B, for the time period $t'_1$ to $t'_2$. New instructions may relate to formation of local strings in a future time after the previously communicated instructions are implemented and completed, or may override already communicated instructions.

The innovative aspects of the subject-matter in this disclosure can be implemented in a power distribution control system having a string of power assets comprising at least two different power assets selected from sources, stores and responsive loads; a router for controlling each of the power assets and for communicating with controllers of other power assets in the string on a peer-to-peer basis; and a server for communicating with the routers of the power assets in the string and for indicating to each router what are the other assets of the string so that the routers of the assets can commence communication with each other, and high level aims at the level of the server which the assets together should attempt to fulfil by negotiating times and quantities of power transfer between themselves. Preferably, the power distribution control system further comprises a database in communication with the server, the database containing, for each asset, its topological position in the power grid relative to other power assets, its power needs or delivery capabilities, and parameters indicative of how flexible are those power needs or capabilities. Preferably, the time characteristics of the power needs or capabilities and flexibility parameters are stored in the database. Preferably, the database additionally stores parameters reported by the power assets indicative of real time needs or capabilities and permissible variations on those needs or capabilities. Preferably, in the power distribution control system, an asset of the power assets has a local controller for maintaining operation of the local asset within a predefined range by switching the asset on or off, and the local controller is coupled to the router for the asset and receives direction from the router influencing the timing of switching.

In one embodiment of the power distribution control system, a first string of first power assets are connected to a first section of a grid and a second string of second power assets are connected to a second section of the grid, and the first and second sections are connected via a pinch point. In another embodiment of the power distribution control system, the power assets include a source, a store and a responsive load such that the store stores energy from the source at times when the source produces more energy than is required by the load and delivers energy to the load at times when the load requires more energy that can be supplied by the source. In a further embodiment, the power distribution control system comprises first and second strings, each with separate clusters of loads, sources and stores and having respective first and second controllers and higher level control means for allocating power elements between the clusters.

The innovative aspects of the subject-matter in this disclosure can also be implemented in a method of operation of a power distribution system having power assets comprising at least two different power assets selected from sources, stores and responsive loads, and providing a local controller for controlling each of the power assets and a server in communication with the local controllers; identifying at the server a set of power assets that are to form a balanced string that is to try to meet objectives set by the server; sending a message from the server to each controller indicating the other assets of the balanced string; and communicating between the local controllers of the assets in the balanced string to negotiate times and quantities of power transfer between themselves that will meet the set objectives. Preferably, in this method, the asset controllers report conditions of the assets to the server and the server computes an ad hoc string of assets and a period of time for the string and communicates to the assets in the string that they shall together form a string for the indicated period of time. Preferably, the asset controllers of the string, upon being informed that they are an ad hoc string, confirm among themselves whether they are able to meet the high level aims of the server and report to the server accordingly. Preferably, the server, upon being informed that the string is unable to meet the high level aims of the server, computes another set of aims and/or another ad hoc string to fulfil an alternative set of aims.

The innovative aspects of the subject-matter in this disclosure can also be implemented in a power distribution control system having a string of power assets comprising a plurality of power assets selected from responsive sources, stores and responsive loads, each being connected to a grid and each having a local router; a server in communication with the local routers; and a control system at the server for anticipating times of peak activity in the grid and for providing to the local routers parameters indicative of future times of peak activity, wherein each local router is adapted to receive the parameters from the control system and to cause its associated asset to actively prepare for the future peak by: in the case of a load, preparing the load to be in a state to consume more energy or require less energy at the time of the peak; in the case of a store, preparing the store by discharging into the grid or charging from the grid in advance of the peak; and in the case of a source, preparing the source to be in a state to produce more energy or less energy at the time of the peak, whereby the assets co-operate at the anticipated time to reduce the effect of the peak on the grid outside the string. Preferably, in the system, the plurality of power assets communicate between themselves on a peer-to-peer basis and collectively confirm to the server their ability to modify their collective behaviour at the time of the peak. Preferably, the respective local router is adapted, in the case of a store and an anticipated peak in demand, to charge the store in advance of the peak, in response to receipt of the parameters. Preferably, the respective local router is adapted, in the case of a store and an anticipated peak in supply, to at least partially discharge the store in advance of the peak in response to receipt of the parameters. Preferably, the respective local router is adapted, in the case of a responsive source and an anticipated peak in supply, to prepare the source, in response to receipt of the parameters, to produce more power in advance of the peak and thereby be in a state to produce less power during the peak. Preferably, the respective local router is adapted, in the case of a responsive source and an anticipated peak in demand, to prepare the source, in response to receipt of the parameters, to produce less power in advance of the peak and thereby be in a state to produce more power during the peak. Preferably, the respective local router is adapted, in the case of a load that operates to heat or cool a body, and in the case of an anticipated peak in demand, to heat or cool the body in advance of the peak, in response to receipt of the parameters. Preferably, the load has a local controller that controls the load to operate with a temperature range between temperatures T1 and T2, and the local router is adapted to receive the parameters from the control system and to cause the load to actively prepare for the future peak by driving the temperature to one end of the temperature range. Preferably, in the system, the respective local router is adapted, in the case of a load that operates to heat or cool a body, and in the case of an anticipated peak in supply, to delay heating or delay cooling the body in advance of the peak, in response to receipt of the parameters. Preferably, the load has a local controller that controls the load to operate within a critical temperature range between temperatures T1 and T2 and, within that range, within a preferred range between preferred temperatures T3 and T4; and the local router is adapted to receive the parameters from the control system and to cause the load to actively prepare for the future peak by allowing the temperature to drift outside the preferred range while remaining within the critical range. In one embodiment of the power distribution control system, the assets are of different types (responsive sources, stores and responsive loads) and prepare to be in a position to exchange power at the time of the future peak and co-operate at that time to exchange power to thereby reduce the effect of the peak on the grid outside the string.

The innovative aspects of the subject-matter in this disclosure can also be implemented in a power distribution control system having a string of power assets comprising a plurality of power assets, selected from responsive sources, stores and responsive loads, each being connected to a grid and each having a local router; and a server in communication with the local routers; wherein the plurality of power assets communicate between themselves on a peer-to-peer basis and collectively confirm to the server their ability to modify their collective behaviour in response to an event in the grid. Preferably, the system further comprises means for monitoring the grid and communicating an event to the routers. Preferably, the system further comprises means for communicating the event from the server to the routers. Preferably, the system further comprises a control system at the server for anticipating a future event in the grid at a future time and for providing to the local routers parameters indicative of the future event. Preferably, in the system, the assets co-operate at the future time to reduce the effect of the event on the grid outside the string. Preferably, in the system, the string of assets are arranged to communicate among themselves their respective flexibilities and reach an agreement over how to limit their overall rate of change of power. Preferably, the system further comprises means for taking measurements in the grid and providing feedback to indicate whether a high-level aim at the level of the server is being achieved by the assets collectively. Preferably, in the system, the assets are arranged to pre-negotiate between themselves in what order they are to respond to an event.

The above description of embodiments and examples is given by way of example only. Various aspects and embodiments of the invention can be combined. Various aspects and embodiments can be modified in accordance with other aspects and embodiments. The scope of the invention is not to be limited by details of the embodiments, but is defined in the appended claims.

The invention claimed is:

1. A power distribution control system comprising:
   first and second strings of power assets, each string including a plurality of power assets selected from: responsive electric sources, electric stores and responsive electric loads, each power asset being connected to a grid and each having an associated local router;
   a server in communication with the local routers, each router having metrology circuitry for measuring at least one of voltage, current and frequency at a grid local to the router; and
   a control system at the server for anticipating times of peak activity in the grid and for providing to the local routers parameters indicative of required behavior between future times t1 and t2,
   wherein t2 is a later time than t1, and
   wherein each local router is adapted to receive the parameters from the control system and to cause the local router associated power asset to actively prepare for the required behavior by:
   in the case of a responsive load in a condition in which the local router is caused to prepare the responsive load to be in a state to require less energy at time t1, causing the responsive load to consumer more energy in advance of time t1, and
   in the case of a responsive load in a condition in which the local router is caused to prepare the responsive load to be in a state to consume more energy at time t1, causing the responsive load to consume less energy in advance of time t1;
   whereby the string of power assets respond between times t1 and t2 to any mismatch between measurement of at least one of voltage, current and frequency at the grid local to the router by the metrology circuitry circuit and said required behavior to reduce the effect of the peak on the grid outside the string of power assets and wherein a higher level controller is associated with the server for allocating power assets between the strings for later reallocating an asset from the first string to the second string.

2. A system according to claim 1 wherein following receipt of parameters indicative of required behavior between future times t1 and t2, the plurality of power assets confirm to the server their ability to modify their collective behaviour at the time of the peak.

3. A system according to claim 1, wherein the respective local router is adapted, in the case of a store and an anticipated peak in demand, to charge the store in advance of the peak, in response to receipt of the parameters.

4. A system according to claim 1, wherein the respective local router is adapted, in the case of a store and an anticipated peak in supply, to at least partially discharge the store in advance of the peak in response to receipt of the parameters.

5. A power distribution control system comprising:
   first and second strings of power assets, each string including a responsive load that operates to heat or cool a body, each power asset being connected to a grid and each having an associated local router;
   a server in communication with the local routers, each router having metrology circuitry for measuring at least one of voltage and frequency at a grid local to the router; and
   a control system at the server for anticipating times of peak activity in the grid and for providing to the local routers parameters indicative of required behavior between future times t1 and t2,
   wherein the behavior is a requirement to be responsive to a rise in voltage and/or frequency between future times t1 and t2;
   each local router is adapted to receive the parameters from the control system and to cause the local router associated power asset to actively prepare for the required behavior by:
   in the case of a responsive load that operates to heat or cool a body, and in the case of an anticipated peak in supply, to delay heating or delay cooling the body in advance of the peak, in response to receipt of the parameters, whereby the load responds between times t1 and t2 to any rise in voltage and/or frequency at the grid local to the router as measured by the metrology circuit to maintain voltage and/or frequency in the grid and wherein a higher level controller is associated with the server for allocating power assets between the strings for later reallocating an asset from the first string to the second string.

6. A system according to claim 5, wherein the load has a local controller that controls the load to operate with a temperature range between temperatures T1 and T2 and wherein the local router is adapted to receive the parameters from the control system and to cause the load to actively prepare for the future peak by driving the temperature to one end of the temperature range.

7. A system according to claim 5, wherein the load has a local controller that controls the load to operate within a critical temperature range between temperatures T1 and T2 and, within that range, within a preferred range between preferred temperatures T3 and T4 and wherein the local router is adapted to receive the parameters from the control system and to cause the load to actively prepare for the future peak by allowing the temperature to drift outside the preferred range while remaining within the critical range.

8. A system according to claim 1, wherein the assets are of different types (responsive sources, stores and responsive loads) and prepare to be in a position to exchange power at the time of the future peak and co-operate at that time to exchange power to thereby reduce the effect of the peak on the grid outside the string.

9. A power distribution control system comprising:
first and second strings of power assets, each string including a plurality of power assets selected from: responsive electric sources, electric stores and responsive electric loads, each asset being connected to a grid and each having a local router, each router having metrology circuitry for measuring at least one of voltage, current and frequency at the grid local to the router; and
a server in communication with the local routers, for providing to the local routers parameters indicative of future required behavior in response to a possible future event in the grid;
in a condition in which the local router associated with a responsive load is arranged to prepare the responsive load to be in a state to require less energy at time t1, the local router causing the responsive load to consume more energy in advance of time t1,
in a condition in which the local router associated with a responsive load is arranged to prepare the responsive load to be in a state to consume more energy at time t1, the local router causing the responsive load to consume less energy in advance of time t1; and
wherein each of the plurality of power assets confirms to the server its future ability to modify its behaviour at time t1 in response to any mismatch between measurement of voltage and/or frequency at the grid local to the router by the metrology circuit and said required behavior at time t1 and wherein a higher level controller is associated with the server for allocating power assets between the strings for later reallocating an asset from the first string to the second string.

10. A system according to claim 9, comprising a control system at the server for anticipating a future event in the grid at a future time and for providing to the local routers parameters indicative of the future event.

11. A system according to claim 9 whereby the assets co-operate at the future time to reduce the effect of the event on the grid outside the string.

12. A system according to claim 9 wherein the assets of the string of assets are arranged to communicate among themselves their respective flexibilities and reach an agreement over how to limit their overall rate of change of power.

13. A system according to claim 9 wherein the metrology circuitry is arranged for taking voltage and/or frequency measurements in the grid and is coupled to a controller in the router for providing feedback to the server to indicate whether a high-level aim at the level of the server is being achieved by the assets collectively.

14. A system according to claim 9 wherein the assets are arranged to pre-negotiate between themselves in what order they are to respond to an event.

15. A power distribution control system comprising:
a first cluster and a second cluster of power assets, each including:
at least one electric source, at least one electric store and at least one responsive load, and
a router for controlling each of the power assets; and
a server for communicating with the routers of the power assets in the respective cluster of power assets and for indicating to each router
high level aims at the level of the server which the assets together should attempt to fulfill;
wherein the responsive load of each cluster has a local controller for maintaining operation of the load within a predefined range by switching the load on or off, and wherein the local controller is coupled to the router for the load and receives direction from the router automatically influencing the timing of switching, and
wherein each of the first and second clusters comprises a separate cluster of electric loads, electric sources, and electric stores, and
wherein a higher level controller is provided for allocating power elements between the clusters for later reallocating an asset from the first cluster to the second cluster.

16. A power distribution control system according to claim 15, further comprising a database in communication with the server, the database containing, for each asset: (i) its topological position in the power grid relative to other power assets, (ii) its power needs, and (iii) parameters indicative of how flexible are those power needs.

17. A power distribution control system according to claim 15, further comprising a database in communication with the server, the database containing, for each asset: (i) its topological position in the power grid relative to other power assets, (ii) its power delivery capabilities, and (iii) parameters indicative of how flexible are those power capabilities.

18. A power distribution control system according to claim 16, wherein the time characteristics of the power needs and flexibility parameters are stored in the database.

19. A power distribution control system according to claim 17, wherein the time characteristics of the power delivery capabilities and flexibility parameters are stored in the database.

20. A power distribution control system according to claim 16, wherein the database additionally stores parameters reported by the power assets indicative of real time needs and permissible variations on those needs.

21. A power distribution control system according to claim 16, wherein the database additionally stores parameters reported by the power assets indicative of real time capabilities and permissible variations on those capabilities.

22. A power distribution control system according claim 15, wherein a first cluster of first power assets are connected to a first section of a grid and a second cluster of second power assets are connected to a second section of the grid, and the first and second sections are connected via a pinch point.

23. A power distribution control system according to claim 15, wherein the power assets include a source, a store and a responsive load such that the store stores energy from the source at times when the source produces more energy than is required by the load and delivers energy to the load at times when the load requires more energy that can be supplied by the source.

24. A power distribution control system comprising:
first and second strings of power assets, each string including a plurality of electric stores, each asset being connected to a grid and each having an associated local router;
a server in communication with the local routers; and
a control system at the server for anticipating times of peak activity in the grid and for providing to the local routers parameters indicative of peak activity between future times t1 and t2;
wherein each local router is adapted to receive the parameters from the control system and to cause the associated store to actively prepare for the future peak by:
in the case of an anticipated peak in demand, charging the store from the grid in advance of time t1, in response to receipt of the parameters,
in the case of an anticipated peak in supply, at least partially discharging the store into the grid in advance of time t1 in response to receipt of the parameters,
whereby the power assets selectively respond to a change in grid frequency at the anticipated time of peak activity as necessary to reduce the effect of the peak on the grid and maintain grid frequency, at the time of the peak, outside the string of power assets and wherein a higher level controller is associated with the server for allocating power assets between the strings for later reallocating an asset from the first string to the second string.

25. A power distribution control system comprising:
a string of power assets including a plurality of responsive electric loads, each load being connected to a grid and each having an associated local router each router having metrology circuitry for measuring at least one of voltage, current and frequency at a grid local to the router wherein each load has a local controller that controls the load to operate within a critical temperature range between temperatures T1 and T2 and, within that range, within a preferred range between preferred temperatures T3 and T4;
a server in communication with the local routers; and
a control system at the server for anticipating times of peak activity in the grid and for providing to the local routers parameters, including flexibility parameters, indicative of required behavior between future times t1 and t2, wherein t2 is a later time than t1, and
wherein each local router is adapted to receive the parameters, including the flexibility parameters, from the control system and to cause the local router associated power asset to actively prepare for the required behavior by:
allowing the temperature to drift, between times t1 and t2, outside the preferred range while remaining within the critical range, based on the received parameters, including the flexibility parameters;
whereby the string of power assets respond between times t1 and t2 to any mismatch between measurement of at least one of voltage, current and frequency at the grid local to the router by the metrology circuitry circuit and said required behavior to reduce the effect of the peak on the grid outside the string of power assets.

26. A system according to claim 25 wherein following receipt of parameters indicative of required behavior between future times t1 and t2, the plurality of power assets confirm to the server their ability to modify their collective behaviour at the time of the peak.

27. A power distribution control system comprising:
a string of power assets including a responsive load that operates to heat or cool a body, each power asset being connected to a grid and each having an associated local router wherein each load has a local controller that controls the load to operate within a critical temperature range between temperatures T1 and T2 and, within that range, within a preferred range between preferred temperatures T3 and T4;
a server in communication with the local routers, each router having metrology circuitry for measuring at least one of voltage and frequency at a grid local to the router; and
a control system at the server for anticipating times of peak activity in the grid and for providing to the local routers parameters, including flexibility parameters, indicative of required behavior between future times t1 and t2,
wherein the behavior is a requirement to be responsive to a rise in voltage and/or frequency between future times t1 and t2;
each local router is adapted to receive the parameters, including the flexibility parameters, from the control system and to cause the local router associated power asset to actively prepare for the required behavior by:
allowing the temperature to drift, between times t1 and t2, outside the preferred range while remaining within the critical range, based on the received parameters, including the flexibility parameters,
whereby the load responds between times t1 and t2 to any rise in voltage and/or frequency at the grid local to the router as measured by the metrology circuit to maintain voltage and/or frequency in the grid.

28. A system according to claim 27, wherein the load has a local controller that controls the load to operate with a temperature range between temperatures T1 and T2 and wherein the local router is adapted to receive the parameters from the control system and to cause the load to actively prepare for the future peak by driving the temperature to one end of the temperature range.

29. A power distribution control system comprising:
a string of power assets including a plurality of power assets selected from: responsive electric sources, electric stores and responsive electric loads, each being connected to a grid and each having a local router, each router having metrology circuitry for measuring at least one of voltage, current and frequency at the grid local to the router wherein each load has a local controller that controls the load to operate within a critical temperature range between temperatures T1 and T2 and, within that range, within a preferred range between preferred temperatures T3 and T4; and
a server in communication with the local routers, for providing to the local routers parameters, including flexibility parameters, indicative of future required behavior in response to a possible future event in the grid;

the local router causing the responsive load to allow the temperature to drift, between future times t1 and t2, outside the preferred range while remaining within the critical range, based on the received parameters, including the flexibility parameters; and wherein each of the plurality of power assets confirms to the server its future ability to modify its behaviour at time t1 in response to any mismatch between measurement of voltage and/or frequency at the grid local to the router by the metrology circuit and said required behavior at time t1.

30. A system according to claim 29, comprising a control system at the server for anticipating a future event in the grid at a future time and for providing to the local routers parameters indicative of the future event.

31. A system according to claim 29 whereby the assets co-operate at the future time to reduce the effect of the event on the grid outside the string.

32. A system according to claim 29 wherein the assets of the string of assets are arranged to communicate among themselves their respective flexibilities and reach an agreement over how to limit their overall rate of change of power.

33. A system according to claim 29 wherein the metrology circuitry is arranged for taking voltage and/or frequency measurements in the grid and is coupled to a controller in the router for providing feedback to the server to indicate whether a high-level aim at the level of the server is being achieved by the assets collectively.

34. A system according to claim 29 wherein the assets are arranged to pre-negotiate between themselves in what order they are to respond to an event.

35. A power distribution control system comprising:
a first cluster and a second cluster of power assets, each including:
at least one store and at least one responsive load, and
a router for controlling each of the power assets; and
a server for communicating with the routers of the power assets in the respective cluster of power assets and for indicating to each router:

high level aims at the level of the server which the assets together should attempt to fulfill between future times t1 and t2, wherein the responsive load of each cluster has a local controller for maintaining operation of the load within a critical temperature range between temperatures T1 and T2 and, within that range, within a preferred range between preferred temperatures T3 and T4 by switching the load on or off, and wherein the local controller is coupled to the router for the load and receives direction from the router, in the form of parameters, including flexibility parameters, automatically influencing the timing of switching allowing the temperature to drift, between times t1 and t2, outside the preferred range while remaining within the critical range, based on the received parameters, including the flexibility parameters.

36. A power distribution control system according to claim 35, further comprising a database in communication with the server, the database containing, for each asset: (i) its topological position in the power grid relative to other power assets, (ii) its power needs, and (iii) parameters indicative of how flexible are those power needs.

37. A power distribution control system according to claim 36, wherein the time characteristics of the power needs and flexibility parameters are stored in the database.

38. A power distribution control system according to claim 35, wherein the database additionally stores parameters reported by the power assets indicative of real time needs and permissible variations on those needs.

* * * * *

UNITED STATES PATENT AND TRADEMARK OFFICE
CERTIFICATE OF CORRECTION

PATENT NO. : 10,678,198 B2  
APPLICATION NO. : 14/826950  
DATED : June 9, 2020  
INVENTOR(S) : Oliver William John Burstall and Peter Martin Bance Page 1 of 1

It is certified that error appears in the above-identified patent and that said Letters Patent is hereby corrected as shown below:

On the Title Page

Item (71) Applicant: change "Origami Limited, Godalming, Surrey (GB)" to --Origami Energy Limited, Cambridge, (GB)--.

Signed and Sealed this  
Twelfth Day of January, 2021

Andrei Iancu  
*Director of the United States Patent and Trademark Office*